United States Patent [19]

Stemme et al.

[11] 4,296,438

[45] Oct. 20, 1981

[54] PROJECTION AND SCANNING SYSTEM FOR PRODUCING VIDEO SIGNALS FROM MOTION PICTURE FILM AND CONTROL SYSTEM USED THEREIN

[75] Inventors: Otto Stemme; Wolfgang Ruf, both of Munich; Eduard Wagensonner, Aschheim, all of Fed. Rep. of Germany

[73] Assignee: AGFA-Gevaert Aktiengesellschaft, Leverkusen, Fed. Rep. of Germany

[21] Appl. No.: 136,114

[22] Filed: Mar. 31, 1980

[30] Foreign Application Priority Data

Mar. 30, 1979 [DE] Fed. Rep. of Germany ....... 2912667

[51] Int. Cl.³ .............................................. H04N 3/36
[52] U.S. Cl. .................................................. 358/214
[58] Field of Search ........................ 358/214, 215, 216

[56] References Cited

U.S. PATENT DOCUMENTS 3,804,978  4/1974  Lemelson .......................... 358/214

*Primary Examiner*—Robert L. Richardson
*Attorney, Agent, or Firm*—Michael J. Striker

[57] ABSTRACT

A projection and scanning system for synchronization of photographic film projection with vertical sync pulses is taught. In this system, developed photographic film is advanced into a projection gate which is larger than the vertical height of an individual photographic frame. As a given film frame passes through the projection gate, it is repeatedly scanned by a mirror and the projected image reflected onto a charge-coupled image sensor which can be used to provide information for a video signal. Perforations on the film enable pulses to be developed at a photocell which are a function of film speed. By processing these pulses, along with vertical sync pulses and appropriate control waveforms, accurate scanning of the film can be achieved, enabling video signals resulting in flickerless television transmissions to be generated.

15 Claims, 5 Drawing Figures

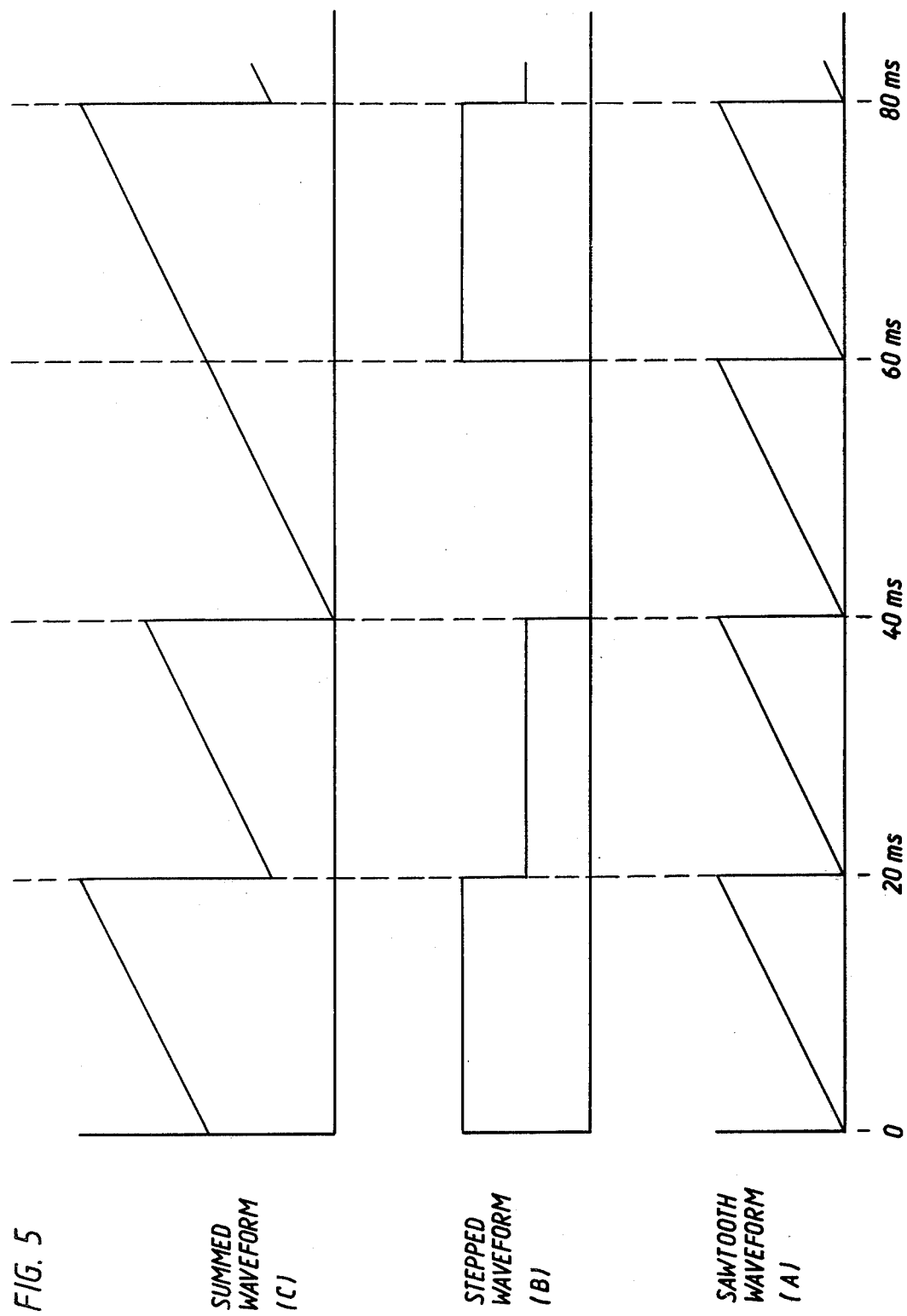

PROJECTION AND SCANNING SYSTEM FOR PRODUCING VIDEO SIGNALS FROM MOTION PICTURE FILM AND CONTROL SYSTEM USED THEREIN

BACKGROUND OF THE INVENTION

This invention pertains to a system which can be used to convert images on motion picture film into video signals for use in television transmissions. More specifically, this invention pertains to devices of this type which can be utilized to produce video signals from continuously driven motion picture film, or can be used to produce video signals from motion picture film which is driven discretely, i.e. frame by frame.

Devices which can produce television signals from film projected in a projector are known. However, transmissions produced by some existing devices have a tendency to flicker on a television screen. The reason why such flickering occurs is that the projection speed of a motion picture projector is substantially slower than the vertical deflection or sync pulses. In the event that the projection of the motion picture film is not precisely coordinated with the vertical sync, flickering will occur.

Additionally, some devices of this type are not well suited for projecting motion picture film in both a continuously driven mode and a discretely driven mode. Although in the normal course of events a motion picture film is projected continuously at normal operating speed, it is sometimes desirable to project individual film frames in a stepwise fashion.

Thus, it would be desirable to provide a system of this type which would eliminate flicker from a television transmission when viewed on a television screen, and it would also be desirable to provide a device which would allow single frames to be projected individually in addition to permitting normal continuous drive for a motion picture film.

SUMMARY OF THE INVENTION

These objects, along with others which will appear hereinafter, are achieved by the use of both a motion picture projector and an optical scanner, which are both synchronized during operation with the vertical sync used in constructing a video signal. In this invention, each individual film frame is scanned an integral number of times, which number depends upon the relative projection speed of the motion picture film with respect to the frequency of the vertical sync. For example, when a vertical half-frame is generated at the rate of 50 Hz, and a motion picture film is conventionally projected at the rate of 16⅔ frames per second, each individual frame is scanned exactly three times in order to ensure that synchronism between film projection and vertical sync takes place.

During the scanning process, individual horizontal lines of the projected image on the motion picture film are sequentially reflected by a moving mirror onto a charge-coupled image sensor. A charge-coupled image sensor is a solid-state device which can convert optically projected images into electrical impulses. A sensor of this type can be regarded as a plurality of photosensors located adjacent to each other along a horizontal line. If, for example, the top line to be transmitted in a television signal were to be reflected onto a charge-coupled image sensor, the light intensities of the points along the top horizontal line of the television picture would be read out in a sequence, with the leftmost point being read out first and the rightmost point being read out last.

As will be seen hereinafter, the motion picture image to be transmitted is divided into a sequence of horizontal lines, and these lines are reflected sequentially onto a charge-coupled image sensor in order, with the topmost horizontal line being reflected first and the bottommost horizontal line being reflected last. This scanning sequence is repeated a plurality of times and after a given photographic frame has been so scanned, the next photographic frame can be scanned in the same fashion.

The motion picture film is equipped with perforations which correspond to the photographic frames which are projected. Each time that a photographic frame is scanned the light source of the projector illuminates the perforations and causes a brief flash of light to be directed upon a photocell. Thus, the output of the photocell can be used in a feedback loop to continuously regulate film projection speed and thereby ensure continuing synchronism with the vertical sync.

As will be seen hereinafter, the mirror which is utilized to accomplish the scanning process is driven by a servo which responds to a servo drive signal. This invention is so designed that this servo drive signal can be easily and simply derived from simple control wave forms that are summed together. As a result of the constructions of the summing portion of the invention, adjustment of the mode of projection from continuous film projection to discrete film projection and vice versa can be easily effected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 includes three graphs showing how control wave forms such as those used in the invention can be summed together for final shaping in the summer of the invention.

DETAILED DESCRIPTION OF PREFERRED EMBODIMENTS

Figure 1:
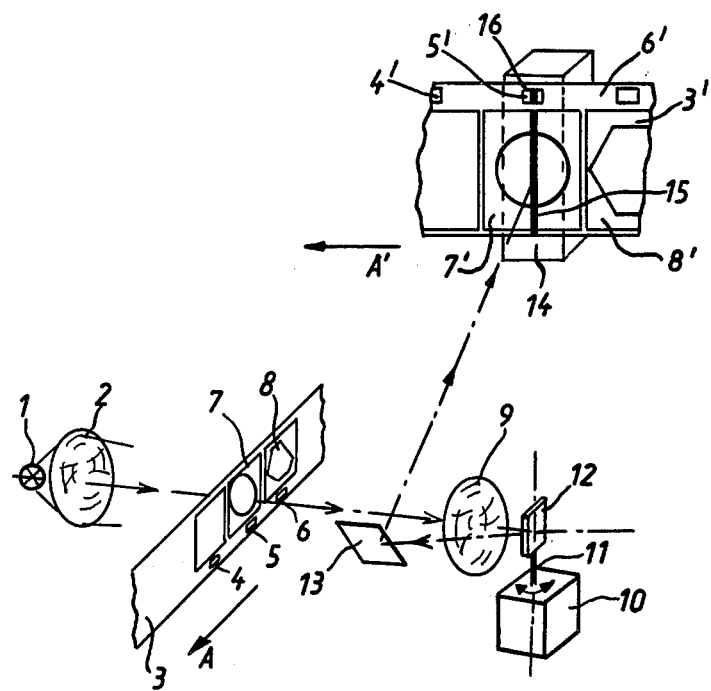
FIG. 1 is a simplified schematic diagram of the mechanical and optical components of the invention.

Referring first to FIG. 1, it can be seen that a strip of motion picture film 3 in Super 8 format is driven through a projector (not shown) in a direction indicated by the arrow A. The projector includes a light source 1, which shines light through a condenser lens 2 for illuminating the film 3.

Film 3, as shown in FIG. 1, has a plurality of photographic frames located adjacent each other in conventional fashion. Each individual frame is associated with a corresponding perforation, the perforations all being located in a vertical line and all being centered aside their corresponding frames.

Two such frames, namely frame 7 and frame 8, are located adjacent each other, and in the position as shown in FIG. 1, the light source 1 illuminates frame 7, with frame 8 being the next frame ready for projection. Light passing through frame 7 passes through an optical transmission system generally indicated by reference numeral 9, onto a plain mirror 12 which is rotatable about axis 11 by servo 10. The image of frame 7 is reflected off mirror 12 onto mirror 13, which reflects this image once again onto a charge-coupled image sensor generally indicated by the reference numeral 14.

In FIG. 1, corresponding image portions are shown to bear reference numerals indicated by primes, so that the image of frame 7 is shown by reference numeral 7', an so forth. Charge-coupled image sensor 14 includes a plurality of image points which collectively define a straight line 15. Those skilled in the art will readily perceive that inasmuch as motion picture film is conventionally projected vertically, line 15 can be understood to traverse frame 7 horizontally between the right and the left, rather than vertically up and down on the image. As the film 3 moves in the direction shown by the arrow A, the image 3' moves in the direction shown by the arrow A'.

Furthermore, a photocell 16 is also located on charge-coupled image sensor 14, at one of the ends of line 15. Inasmuch as each perforation is aligned with the horizontal center line of a corresponding frame, and inasmuch as line 15 is aligned with photocell 16, it can be seen that when a given frame is scanned with respect to light source 1, the photocell 16 will be briefly illuminated by a flash of light from light source 1. In FIG. 1, light source 1 is shown to be illuminating frame 7, which is shown to be scanned. Thus, light passes through perforation 5, through optical transmission system 9, and reflects off mirrors 12 and 13 to impinge upon photocell 16.

When an image is projected on charge-coupled image sensor 14 (i.e. along line 15) the light values of the image are converted into electrical impulses for use in the construction of a video signal. It is only significant here to note that by dividing each frame into a large number of horizontal lines or sectors, and by reading out the contents of charge-coupled image converter 14 to appropriate electronic apparatus (not shown), all the light values in the entire imaged region may be converted into electrical impulses and used to construct a video signal. Because the speed with which charge-coupled image converter 14 can be read out is far in excess of the rate at which film 3 is projected in the projector, the conversion of the image 7' of frame 7 can essentially be considered as being a sequential read-out of discrete horizontal lines one after another.

Figure 2:
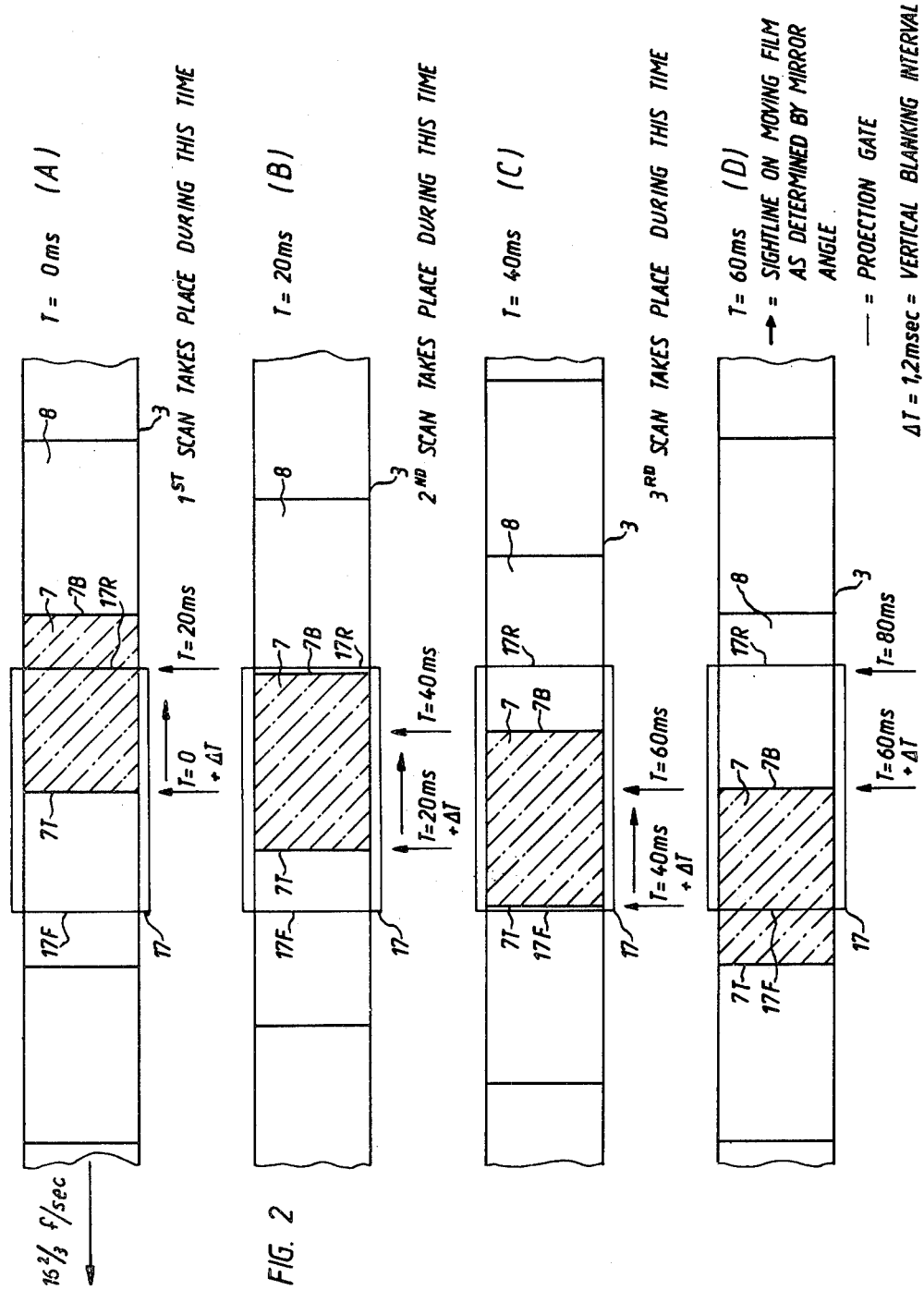
FIG. 2 is a simplified and horizontally distorted explanatory series of graphs, showing how scanning of the motion picture film actually takes place.

It is now appropriate to refer to FIG. 2 in order to follow the actual scanning sequence performed by this invention. With the exception of the backskips executed by mirror 12 as are described below, mirror 12 is so tilted that an image of film 3 is always projected onto line 15. However, the image viewed by charge-coupled image sensor 14 at line 15 does not move at the rate at which film 3 passes past light source 1. Mirror 12 is generally parallel to the surface of film 3. As mirror 12 rotates on axis 11, the image projected onto line 15 by reflection will shift depending upon the angle between the surfaces of film 3 and mirror 12.

The projection apparatus includes a projection gate 17 which is shown as a rectangle in FIG. 2. That portion of film 3 located inside projection gate 17 will be illuminated by light source 1, while that portion of film 3 outside the projection gate 17 will remain unilluminated. Initially, the case where the top edge of frame 7 is centered in projection gate 17 is considered. It will be noted that FIG. 2 is shown to be disproportionately elongated in the vertical direction, for the sake of clarity. Ordinarily, individual film frames such as 7 and 8 are oriented transversely with respect to film 3, and not longitudinally as is shown in FIG. 2. In FIG. 2(A), the top edge 7T of frame 7 is exactly centered in projection gate 17, midway between front edge 17F and rear edge 17R. At this position, mirror 12 is initially so tilted that top edge 7T of frame 7 is projected onto line 15. Thus, line 7T is initially viewed by charge-coupled image sensor 14, as can be seen by the position of the left-hand arrow shown beneath FIG. 2(A). As film 3 moves to the left as viewed in FIG. 2, mirror 12 is tilted so as to change the portion of projection gate 17 which is viewed by charge-coupled image converter 14 at line 15. Thus, as the film 3 moves, the portion of film 3 which is actually viewed at line 15 moves not only as a result of the movement of film 3, but also as a result of the movement of mirror 12.

Film 3 is normally projected at the rate of $16\frac{2}{3}$ frames per second. Thus, in 20 milliseconds, frame 7 will have moved exactly one third of its vertical height into projection gate 17, so that top edge 7T of frame 7 moves towards front edge 17F of projection gate 17. As is shown in FIG. 2(B), after 20 milliseconds bottom line 7B of frame 7 will be located just inside projection gate 17, adjacent edge 17R. However, mirror 12 will have moved during this 20 millisecond period in an angular amount sufficient to cause the portion of the image viewed by charge-coupled image sensor 14 to be located directly adjacent rear edge 17R of projection gate 17. Thus, even though film 3 has only moved one-third of its height into projection gate 17, the entire surface of frame 7 will have been illuminated by light source 1 and the image of frame 7 will have been completely scanned by charge-coupled image converter 14.

After this first scan has taken place, mirror 12 performs a backskip. For this brief period of time the video signal is blanked by the vertical blanking signal. Mirror 12 not only moves towards its original position (i.e. that position in which charge-coupled image sensor 14 views the horizontal center line of projection gate 17) but also passes that position, so that charge-coupled image sensor 14 views a horizontal line within projection gate 17 which is closer to edge 17F thereof and which is located approximately one-quarter of the way between edges 17F and 17R. As can be seen from FIG. 2(B), when mirror 12 has finished its first backskip top edge 7T will once again be projected along line 15.

As film 3 continues to move to the left as viewed in FIG. 2, mirror 12 is once again rotated so as to precess the horizontal line on frame 7 which is viewed at line 15. After another 20 milliseconds, as can be seen in FIG. 2(C), film 3 will have moved an additional one-third of its vertical height towards edge 17F so that edges 17F and 7T are directly adjacent one another. As before, mirror 12 will once again have been tilted to the point where bottom edge 7B is projected along line 15. Thus, once again, although film 3 has only moved one-third of its height into projection gate 17, its entire surface has once again been scanned as viewed from line 15 so that frame 7 will have been moved only two-thirds of its vertical height while having been completely scanned twice.

As before, mirror 12 once again executes another backskip, and rotates even further so as to cause edge 7T to be viewed at line 15. After another 20 milliseconds, as can be seen at FIG. 2(D), film 3 will move an additional one-third of its vertical height so that edge 7B is exactly aligned with the horizontal center line of projection gate 17. Meanwhile, a mirror 12 has once again rotated so as to cause the entire surface of frame 7 to be scanned, and at the end of this additional 20 milliseconds edge 7B of frame 7 will once again be projected onto line 15. Thus, the entire surface of frame 7 has been completely scanned for a third time. It will be noted that at the end of this third scan, mirror 12 need not and does not execute another backskip because it is now in its original position relative to projection gate 17, and is precisely aligned with the top horizontal line of frame 8.

Hence, it can be seen that although frame 7 has only moved a distance equal to its vertical height, it has been scanned three times, as viewed at line 15. The reason why such scanning can occur is because projection gate 17 is approximately one-third higher than the height of a conventional film frame which is projected through it. Those skilled in the art will readily perceive that photographic frames such as frames 7 and 8 do not in actuality abut each other exactly, and that therefore certain very minor adjustments must be made to the position of mirror 12 in order to cause absolutely precise scanning to occur and thereby eliminate flicker, as is described below.

Figure 3:
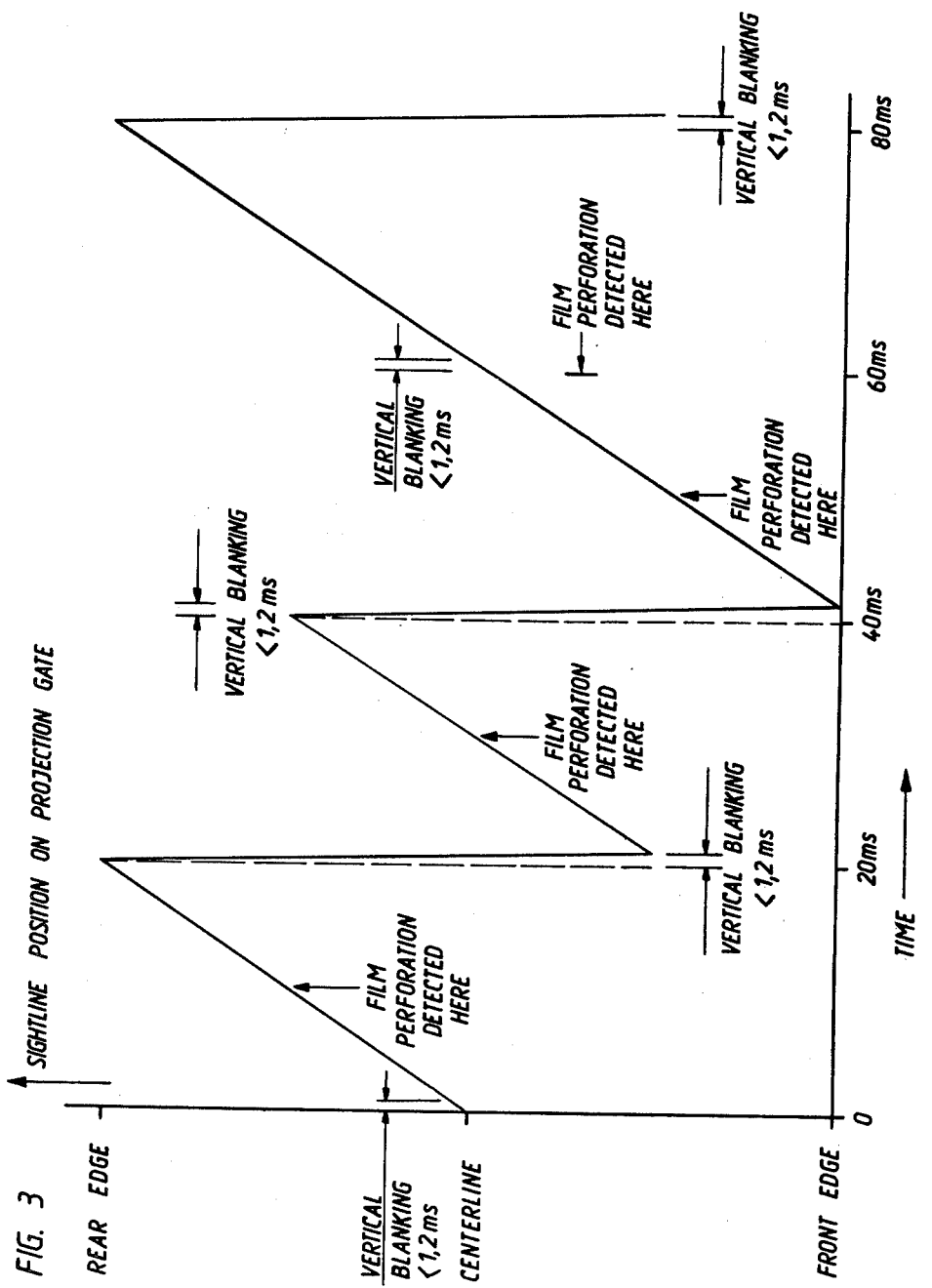
FIG. 3 is a graph showing the relative position of the sightline on the projection gate as viewed from the charge-coupled image sensor, as a function of time.

FIG. 3 is a graph of the sightline (i.e. the vertical position of the horizontal line viewed at line 15 with respect to projection gate 17) as a function of time. Initially, this sightline was located at the center line of projection gate 17. During the first 20 milliseconds, mirror 12 was rotated sufficiently to cause the sight line to move to edge 17R of projection gate 17. At this point, a backskip occurred. This backskip is extremely fast, and takes place in less than 1.2 milliseconds. After the backskip takes place, mirror 12 is so positioned that the sightline is located one-fourth of the distance between edges 17F and 17R of projection gate 17. From this position, mirror 12 rotates once again until the sightline is located three-fourths of the distance between edges 17F and 17R. Once again, another backskip takes place during a period not exceeding 1.2 milliseconds, to cause the sightline to be located adjacent front edge 17F. During the next 20 millisecond period, mirror 12 is once again rotated until the sightline is located at the center line of projection gate 17, ready for a subsequent scan of a subsequent frame.

Inasmuch as every video signal includes vertical sync pulses during which the screen is blank, and inasmuch as mirror 12 must backskip in order to accomplish the first two scans of each frame, the motion of mirror 12 is so coordinated with the vertical sync as to cause mirror backskips to occur exactly during the vertical blanking periods. Since there never comes a time when charge coupled image sensor 14 is unilluminated by an image of film 3 while video information is being displayed across the screen of a television receiver receiving the video signal, flicker is entirely eliminated. In other words, the blacking-out of charge-coupled image sensor 14 which occurs during mirror backskip is synchronized with the blacking-out of the television screen during vertical blanking, and at no other time. FIG. 3 shows this relationship.

Moreover, it will be remembered that each frame is associated with a perforation located at one end of its horizontal center line. Thus, as the scanning occurs, photocell 16 will be periodically illuminated by light source 1 shining through the perforations. As is shown in FIG. 3, these quick periods of illumination occur when mirror 12 directs the sightline along line 15 onto the horizontal center line of the scanned photographic frame 7. Thus, in the middle of each scan (three scans for one photographic frame) a pulse is produced by photocell 16. As will be seen hereinafter, these pulses are also used as synchronizing pulses in order to keep projection speed synchronized with the 50 Hz vertical sync.

Those skilled in the art will readily understand that in the event a linear servo 10 is used to rotate mirror 12 along axis 11, that the graph shown in FIG. 3 would, if embodied in the voltage of a servo drive signal, cause servo 10 to rotate mirror 12 in an appropriate fashion and thereby ensure accurate scanning. Thus, it is the object of the electronic control system of this invention to produce a servo drive signal which has a voltage that varies as the graph shown in FIG. 3.

Figure 4:
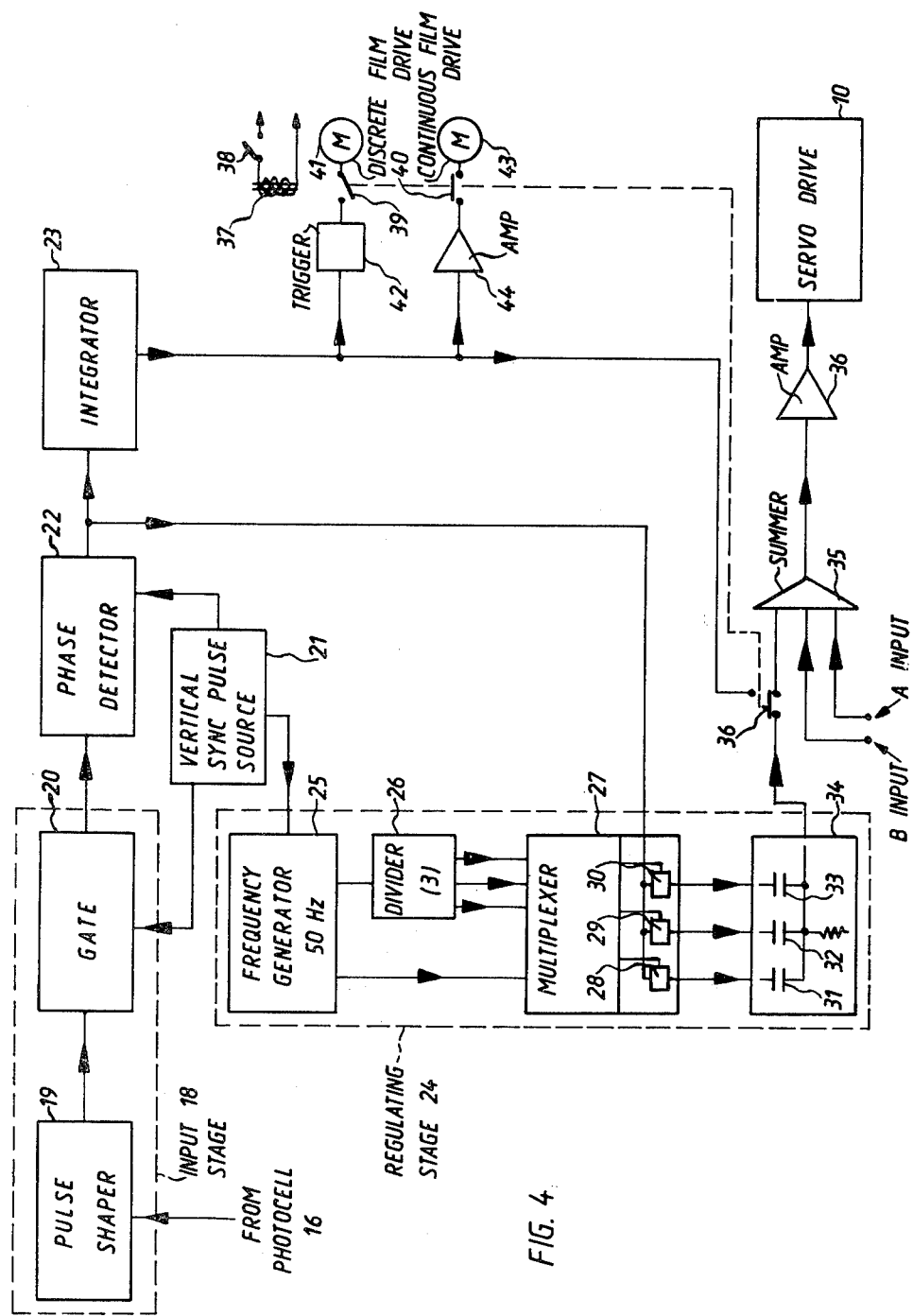
FIG. 4 is a block diagram showing the electronic control system utilized in this invention.

In FIG. 4, the output of photocell 16 is routed to an input stage 18. Since the pulses from photocell 16 are generally sinusoidal, they are routed to pulse shaper 19 within input stage 18 in order to shape the pulses into square waves. The shaped pulses thus formed are routed to gate 20, also located within input stage 18.

Because, as will be seen hereinafter, these pulses are used as synchronizing pulses, it is important that only proper pulses be allowed to pass into the rest of the control system. In the event that spurious pulses are generated by virtue of film defects, from stray light, or other possible sources, such spurious pulses must be filtered out or a danger of unsynchronizing mirror motion, film projection, and vertical blanking will occur. In order to prevent any spurious pulses from entering the rest of the system, gate 20 is so designed as to pass only those pulses which occur at 20 millisecond intervals and coinicde with the 50 Hz vertical sync. In order to accomplish this objective, gate 20 is constructed as a monostable multivibrator with a pulse duration nearly equal to the inverse of the frequency of the vertical sync. Hence, gate 20 is repeatedly triggered by vertical sync pulses from source 21. While gate 20 is in its astable state, no pulses will be able to pass through gate 20 until stable state has been reached once again. As a result, gate 20 screens out spurious pulses from photocell 16 when they do not properly coincide with the vertical sync. Non-spurious pulses generated by photocell 16 are then routed from gate 20 out of input stage 18 to phase detector 22. Phase detector 22, in a fashion well known to those skilled in the art, serves as a comparator to generate an error signal which is proportional to the phase difference between the vertical sync pulses and the pulses generated by photocell 16. This error signal is then routed to integrator 23, which may merely be a capacitor connected between the error signal and ground. Integrator 23 will thus produce a constant voltage in the event that there is no phase shift between the pulses generated by photocell 16 and the vertical sync pulses generated by source 21. In the event that a phase difference does develop, the voltage produced at the output of integrator 23 will be produced in such a direction as to enable a drive motor to be accordingly speeded up or slowed down, in order to keep projection speed held essentially constant with respect to the vertical sync. Thus, the output of integrator 23 can be used as a motor drive signal in order to keep projection speed and vertical sync in phase with each other.

Although the circitry described above can thus be seen to serve the purpose of synchronizing projection speed with vertical sync, it is also necessary to synchronize operation of servo 10 with the vertical sync in order to make sure that scanning occurs in synchronism with vertical blanking. To this end, regulating stage 24 is provided. Regulating stage 24 includes a frequency generator 25 which is operated in synchronism with vertical sync pulse source 21. As an alternative, frequency generator 25 can be utilized to provide the vertical sync directly, in which case frequency generator 25 would be used to feed gate 20 and phase detector 22, rather than utilizing an independent source 21 such as is shown in this embodiment.

In any event, the output of frequency generator 25 is for all practical purposes equivalent to an accurate vertical sync pulse. Frequency generator 25 is connected to frequency divider 26, which divides the frequency produced by frequency generator 25 into three.

Then, frequency generator 25 and the three outputs of divider 26 are routed to multiplexer 27. Multiplexer 27 operates three electronic switches 28, 29, and 30. Switches 28, 29, and 30 are all connected to the error signal produced by phase detector 5. When closed, each of these switches 28, 29, and 30 feeds a corresponding capacitor 31, 32, and 33. These capacitors also serve as integrators in the same general fashion as does integrator 23. However, capacitors 31, 32, and 33 are only energized by their individual switches 28, 29, and 30. Each switch is closed during a corresponding one of the scanned periods of an individual frame. Thus, for example, switch 28 can be closed during the first scan of any individual photographic frame, while the other two switches 29 and 30 are open. Likewise, switch 29 can be closed during the second scan of any individual frame, while the other two switches 28 and 30 are open. In a similar fashion, switch 30 can be closed during the third scan of any indidual photographic frame, while switches 28 and 29 are open. In this fashion, the error signal generated by phase detector 22 can be used to generate a correction signal that can be used to regulate backskip motion of mirror 12 and that can also be used to compensate for the slight separation between adjacent photographic frames on the film. It can be seen that by utilizing multiplexer 27 in this fashion, a small correction signal is generated by integration of the special phase error signal for each of the three scans of an individual photographic frame. This has the effect of enabling a mirror position correction. It is to be mentioned that only the difference of phase error signals will come to the output of the regulation stage 24. The phase error caused by photographic film movement is eliminated by controlling the speed of the drive motor. Capacitors 31, 32, and 33 together form a second integrator 34, which is part of regulating stage 24. The correction signal generated by second integrator 34 can then be routed to one input of summer 35 through switch 36 which will be discussed hereinafter. Summer 35 generates the servo drive signal which is used to operate servo drive 10. Summer 35 can be constructed in conventional fashion using an operational amplifier with inputs connected to resistances that adjust the relative weights assigned by the summer 35 to the signals appearing at its inputs. One input to summer 35 thus carries the correction signal generated by second integrator 34. A sawtooth control waveform can be introduced to a second input of summer 35 identified by A in FIG. in FIG. 4. This waveform is shown at FIG. 5(A). As can be seen in FIG. 5, this control waveform is a standard sawtooth wave of constant amplitude and period equal to 20 milliseconds. The third input of summer 35, identified by B in FIG. 4, can carry a stepped control waveform such as is shown in FIG. 5(B) of the drawings. Referring for the moment to FIG. 5, it can be seen that the stepped control waveform shown in FIG. 5(B) has a periodicity of 60 milliseconds. During the first 20 milliseconds, the stepped control waveform has a high voltage which, for purposes of this discussion, can be considered as having an amplitude of unity. At 20 milliseconds, the stepped control waveform then drops down to a voltage equal to one-half. The voltage of the stepped control waveform remains at this one-half figure for the next 20 milliseconds, and subsequently drops down to zero, where it remains for the final 20 milliseconds of its period. As can be seen from FIG. 5(C), when the stepped control waveform is algebraically added to the sawtooth control waveform, a summed waveform results which extremely closely approximates a desirable servo drive signal such as that shown in FIG. 3. The correction voltage or signal of the integration circuit 34 will be added to the summed waveform according to FIG. 5(C). The waveform of this correction signal is similar to the waveform of the signal according to FIG. 5(B). The amplitudes of the stepped correction signal are very small with respect to the amplitudes of the signal according to FIG. 5(B) and are proportional to the amplitudes of the phase error signals of the phase detector 22. The amplitude or position of the backskip of mirror 12 ist controlled by the correction voltage or signal. As a result the phase deviations between the control pulses of the photocell 16 and the vertical sync pulses are minimum.

Thus, when the servo drive signal produced by summer 35 is amplified in amplifier 36, servo drive 10 can be appropriately driven in order to properly rotate mirror 12 along axis 11 in an accurate fashion consistent with proper scanning of the photographic frames on the film.

A relay 37 which can be manually energized with switch 38 can open and close switches 36, 39 and 40 all together. As can be seen from FIG. 4, switch 39 can connect or disconnect drive motor 41 from trigger circuit 42, while switch 40 an connect or disconnect drive motor 43 from amplifier 44. Trigger circuit 42 and amplifier 44 are fed by the motor drive signal produced by integrator 23. In the position shown, which corresponds to the relay position in which the invention herein is adjusted to operate in a continuous film drive mode, switch 39 is opened, switch 40 is closed, an switch 36 ist switched so as to cause the directing signal to be applied to the switched input of summer 35.

Thus, motor 43 will be energized by the motor drive signal, whereas motor 41 will remain unenergized. Motor 43 is a continuous film drive motor which is designed to operate the projector (not shown) to project the film continuously so as to project a motion picture. Thus, it can be seen from the above description that the speed of motor 43 will be determined by the synchronism between the actual speed of the film and the vertical sync pulses from source 21. As motor 43 drives the film, the two control waveforms are introduced to the unswitched inputs of summer 35 and the servo drive 10 operates so as to cause mirror 12 to rotate about axis 11 in accordance with the graph shown in FIG. 3.

However, in the event that the invention is to be utilized to project the film frames discretely one after another in a series of steps, the relay 37 can be switched by switch 38 to close switch 39, open switch 40, and connect the switched input of summer 35 to the motor drive signal generated by integrator 23. Then, increases and decreases in the motor drive signal produced by integrator 23 can be used to trigger trigger circuit 42, which may be a Schmitt trigger or the like. This will periodically energize motor 41, which can serve as a drive motor when the film is to be advanced discretely rather than continuously. Moreover, since the film can now be advanced in a different phase relationship with rotation of mirror 12, the stepped control waveform applied to input B can be completely eliminated and the film can be stepped in such a fashion that mirror 12 will merely oscillate between two extreme positions located equidistant from the center line of projection gate 17.

The use of two separate motors, namely motor 41 and motor 43, is not necessary to the practice of this invention. Motor 41, for example, may be used as a tensioning motor for the film during projection, or may be used as a rewind motor for film which has been already projected. Alternatively, only one motor need be used to perform all mechanical advance and rewind functions of the projector. Modifications of this type are well within the knowledge of one skilled in the art.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A projection and scanning system designed to repeatedly project images from a motion picture film or from a still picture film onto a fixed horizontal line along which a charge-coupled image sensor may be placed, in order to produce a flickerless video signal from a motion or still picture, comprising:
   a projector which can be loaded with a motion or still picture film and which operates in a manner that images on the film are projected from the projector;
   a movable mirror upon which images projected from the projector are directed;
   a scanner connected to the mirror and cooperating with the projector in a manner that the mirror is moved to reflect successive horizontal lines of images projected by the projector onto a fixed horizontal line in sequence;
   a synchronizer synchronizing operation of the scanner or the mirror movement with the movement of the motion picture film or with the position of each image of the motion or still picture film being projected in still projection, so that the sequence runs in synchronism from a top horizontal line of each image being moved or unmoved during projection by the projector to a bottom horizontal line of each image projected by the projector;
   a phase detecting element located in the plane of the charge-coupled image sensor in a fixed relationship which operates in a manner that the projector projects a phase signal from a phase mark of each image onto the phase detecting element; and
   a phase detecting circuit being connected with said phase detecting element in which a phase error signal is produced when the phase of the vertical sync pulses of the video picture differs from the phase of the scanned moved or unmoved picture of the motion or still picture film.

2. The system defined by claim 1, wherein the scanner, synchronizer and projector cooperate in a manner that the sequence is completely repeated a plurality of times for each photographic frame on the film prior to reflection of an image of a subsequent photographic frame on the film.

3. The system defined by claim 1, wherein the synchronizer responds to perforations in the film.

4. The system defined in claim 3, wherein the perforations are illuminated by the projector.

5. The system defined in claim 4, wherein the phase detecting element is a photoreceiver element which is positioned in the plane of the charge coupled image sensor so as to receive synchronization pulses from the illuminated perforations of each image.

6. An electronic control system in a projection and scanning system as defined in claim 1 for producing a synchronized operation of a servo and a projector motor with vertical sync pulses in the video signal, in order to provide a flickerless video signal from a motion picture film driven by the motor in the projection system wherein the frequency of the video frame signals is a multiple of the frequency of the images of the moving film, the control system being designed for use with at least one control waveform, comprising:
   an input stage responsive to motion of the film and of the position of the phase mark of each scanned image and producing a control signal characteristic thereof;
   a comparator responsive to vertical sync pulses and to said control signal and generating an error signal characteristic of synchronization therebetween;
   a regulating stage responsive to the vertical sync pulses and to the error signal and successively generating correction signals during the period of each vertical sync pulse whereby the value of each correction signal is dependent on the value of said error signal such as to correct the vertical deviations of the positions of the video frames during the multiple scanning of each photographic image;
   a first integration stage responsive to the error signal and generating a motion drive signal in response thereto; and
   a summer responding to at least one control waveform and to the correction signal and generating a servo drive signal for the mirror movement, the summer operating in a manner that the servo drive signal is a linear sum of all control waveforms and the correction signal.

7. The system defined by claim 6, wherein the system can be adjusted to synchronize both continuously driven film and stepwise driven film, wherein the summer has a switchable input, the input being so switched that the summer responds to the correction signal when the system is adjusted to synchronize continuously driven film, and the summer fails to respond to the correction signal when the system is adjusted to synchronize discretely driven film, in which case the summer responds to the motor drive signal of the first integration stage.

8. The system defined by claim 6, wherein the input stage responds to pulses generated by performations in the film.

9. The system defined by claim 6, wherein the input stage includes a gate which gates the input stage in synchronism with the vertical sync pulses.

10. The system defined by claim 9, wherein the gate is a monostable multivibrator.

11. The system defined by claims 8, 9 or 10, wherein the pulses are produced by a photoelectric cell illuminated by the projector.

12. The system defined by claim 6, wherein the regulating stage includes a multiplexer which multiplexes the error signal during the period of each vertical sync pulse, and wherein the regulating stage further includes a second integrator which integrates error signals so multiplexed, which signals successively are switched to the summer each for a time which is equal to the period of each vertical sync pulse, so that only the deviations of the error signals cause correction of controlling signals of the servo drive.

13. The system defined by claims 6 or 7, wherein there are two control waveforms, and wherein the summer has three inputs.

14. The system defined by claim 13, wherein one of the control waveforms is a sawtooth wave and wherein an other control waveform has a stepped waveform wherein the frequency of the step signal is equal to the frequency of the moved pictures of the motion picture film and wherein the number of steps within each period of the step signals equals the number of scannings for one photographic picture.

15. An electronic control system in a projection and scanning system as defined in claim 1 for producing a motor drive signal and a servo drive signal in order to synchronize operation of a servo and a projector motor with each other and with vertical sync pulses in the video signal, in order to produce a flickerless video signal from unmoved pictures of a motion or still picture film driven stepwise by the motor in the projection system, the control system being designed for use with a least one control waveform, comprising:

an input stage responsive to the position of the phase mark of each scanned image and producing a control signal characteristic thereof;

a comparator responsive to vertical sync pulses and to said control signal and generating an error signal characteristic of synchronization therebetween;

an integration stage responsive to the error signal and generating a motion drive signal in response thereto; and a summer responding to at least one control waveform and to the motion drive signal and generating a servo drive signal for the mirror movement, the summer operating in a manner that the servo drive signal is a linear sum of all control waveforms.

* * * * *